US011943329B2

(12) United States Patent
Barton et al.

(10) Patent No.: US 11,943,329 B2
(45) Date of Patent: *Mar. 26, 2024

(54) PARALLEL REDUNDANCY PROTOCOL (PRP) USING NON-OVERLAPPING RESOURCE UNIT (RU) GROUPINGS ON A RADIO

(71) Applicant: Cisco Technology, Inc., San Jose, CA (US)

(72) Inventors: Robert E. Barton, Richmond (CA); Vishal Satyendra Desai, San Jose, CA (US); Jerome Henry, Pittsboro, NC (US); Malcolm Muir Smith, Richardson, TX (US)

(73) Assignee: Cisco Technology, Inc., San Jose, CA (US)

( * ) Notice: Subject to any disclaimer, the term of this patent is extended or adjusted under 35 U.S.C. 154(b) by 0 days.

This patent is subject to a terminal disclaimer.

(21) Appl. No.: 17/676,911

(22) Filed: Feb. 22, 2022

(65) Prior Publication Data
US 2022/0182470 A1 Jun. 9, 2022

Related U.S. Application Data

(62) Division of application No. 16/680,230, filed on Nov. 11, 2019, now Pat. No. 11,258,888.

(51) Int. Cl.
*H04W 4/00* (2018.01)
*H04L 1/22* (2006.01)
(Continued)

(52) U.S. Cl.
CPC .............. *H04L 69/40* (2013.01); *H04L 1/22* (2013.01); *H04L 61/50* (2022.05); *H04W 28/26* (2013.01);
(Continued)

(58) Field of Classification Search
CPC . H04L 69/40; H04L 1/22; H04L 61/50; H04L 5/0007; H04L 2101/622;
(Continued)

(56) References Cited

U.S. PATENT DOCUMENTS 5,946,313 A 8/1999 Allan et al.
8,693,413 B2 * 4/2014 Kanazawa ............ H04L 1/0026
455/450
(Continued)

FOREIGN PATENT DOCUMENTS

CN 103297309 B 12/2016
WO WO2015170793 A1 11/2015
WO WO-2016119754 A1 * 8/2016 ............ H04W 24/02

OTHER PUBLICATIONS

"Workgroup Bridges" Cisco Wireless Controller Configuration Guide, Release 8.5, Cisco.com, May 11, 2011, 44 pp.
(Continued)

*Primary Examiner* — Phuongchau Ba Nguyen
(74) *Attorney, Agent, or Firm* — Merchant & Gould P.C.

(57) ABSTRACT

Parallel Redundancy Protocol (PRP) using non-overlapping Resource Unit (RU) groupings may be provided. A first computing device may associate to a first Access Point (AP) at a virtual Media Access Control (MAC) address. Next, the first computing device may associate to a second AP at the virtual MAC address. Then data from a data frame may be replicated to a first one or more RUs in a channel. The first one or more RUs may be assigned to the first AP. Data from the data frame may then be replicated to a second one or more RUs in the channel. The second one or more RUs may be assigned to the second AP and may not overlap the first one or more RUs.

14 Claims, 5 Drawing Sheets

(51) Int. Cl.
    *H04L 61/50*     (2022.01)
    *H04L 69/40*     (2022.01)
    *H04W 28/26*     (2009.01)
    *H04L 5/00*     (2006.01)
    *H04L 101/622*     (2022.01)
    *H04W 88/08*     (2009.01)

(52) U.S. Cl.
    CPC ...... *H04L 5/0007* (2013.01); *H04L 2101/622* (2022.05); *H04W 88/08* (2013.01)

(58) Field of Classification Search
    CPC ... H04L 12/40189; H04L 45/28; H04L 45/24; H04L 29/06; H04W 28/26; H04W 88/08; H04W 80/04; H04W 88/06; H04W 84/18
    See application file for complete search history.

(56) References Cited

U.S. PATENT DOCUMENTS

| | | | | |
|---|---|---|---|---|
| 8,831,756 | B2 | 9/2014 | Gerstmaier et al. | |
| 9,712,383 | B2 * | 7/2017 | Lu | H04L 61/5038 |
| 11,057,922 | B2 * | 7/2021 | Patil | H04W 74/008 |
| 11,258,888 | B2 * | 2/2022 | Barton | H04L 1/22 |
| 2006/0023683 | A1 * | 2/2006 | Lee | H04W 36/0011 |
| | | | | 455/436 |
| 2006/0045049 | A1 * | 3/2006 | Chung | H04W 36/14 |
| | | | | 370/466 |
| 2006/0200543 | A1 * | 9/2006 | Kong | H04L 12/66 |
| | | | | 709/223 |
| 2008/0049703 | A1 * | 2/2008 | Kneckt | H04W 68/00 |
| | | | | 370/342 |
| 2008/0205385 | A1 * | 8/2008 | Zeng | H04W 72/30 |
| | | | | 370/389 |
| 2009/0290537 | A1 * | 11/2009 | Berglund | H04L 12/4633 |
| | | | | 370/328 |
| 2012/0014386 | A1 * | 1/2012 | Xiong | H04L 61/103 |
| | | | | 370/392 |
| 2013/0086665 | A1 * | 4/2013 | Filippi | H04L 12/062 |
| | | | | 726/7 |
| 2013/0301627 | A1 * | 11/2013 | Chen | H04W 12/08 |
| | | | | 370/338 |
| 2018/0115396 | A1 | 4/2018 | Herr et al. | |
| 2018/0279171 | A1 * | 9/2018 | Matsuo | H04L 5/0007 |
| 2019/0089674 | A1 * | 3/2019 | Seino | H04L 61/5046 |
| 2019/0116086 | A1 * | 4/2019 | Mueller | H04L 12/4641 |
| 2019/0150063 | A1 | 5/2019 | Chu et al. | |
| 2019/0159032 | A1 | 5/2019 | Mueller | |
| 2020/0092881 | A1 | 3/2020 | Nezou et al. | |
| 2021/0051722 | A1 * | 2/2021 | Huang | H04W 72/04 |

OTHER PUBLICATIONS

International Search Report and Written Opinion issued in Application No. PCT/US2020/058815, dated Feb. 5, 2021; (17 pages).
International Preliminary Report on Patentability for International Application No. PCT/US2020/058815, dated May 27, 2022, 10 Pages.

* cited by examiner

PARALLEL REDUNDANCY PROTOCOL (PRP) USING NON-OVERLAPPING RESOURCE UNIT (RU) GROUPINGS ON A RADIO

RELATED APPLICATION

This Application is a divisional of U.S. patent application Ser. No. 16/680,230, filed Nov. 11, 2019, the disclosure of which is incorporated herein by reference in its entirety.

TECHNICAL FIELD

The present disclosure relates generally to low latency wireless communications.

BACKGROUND

In computer networking, a wireless Access Point (AP) is a networking hardware device that allows a Wi-Fi compatible client device to connect to a wired network and to other client devices. The AP usually connects to a router (directly or indirectly via a wired network) as a standalone device, but it can also be an integral component of the router itself. Several APs may also work in coordination, either through direct wired or wireless connections, or through a central system, commonly called a Wireless Local Area Network (WLAN) controller. An AP is differentiated from a hotspot, which is the physical location where Wi-Fi access to a WLAN is available.

Prior to wireless networks, setting up a computer network in a business, home, or school often required running many cables through walls and ceilings in order to deliver network access to all of the network-enabled devices in the building. With the creation of the wireless AP, network users are able to add devices that access the network with few or no cables. An AP connects to a wired network, then provides radio frequency links for other radio devices to reach that wired network. Most APs support the connection of multiple wireless devices to one wired connection. APs are built to support a standard for sending and receiving data using these radio frequencies.

BRIEF DESCRIPTION OF THE FIGURES

The accompanying drawings, which are incorporated in and constitute a part of this disclosure, illustrate various embodiments of the present disclosure. In the drawings.

DETAILED DESCRIPTION

Overview

Figure 1:
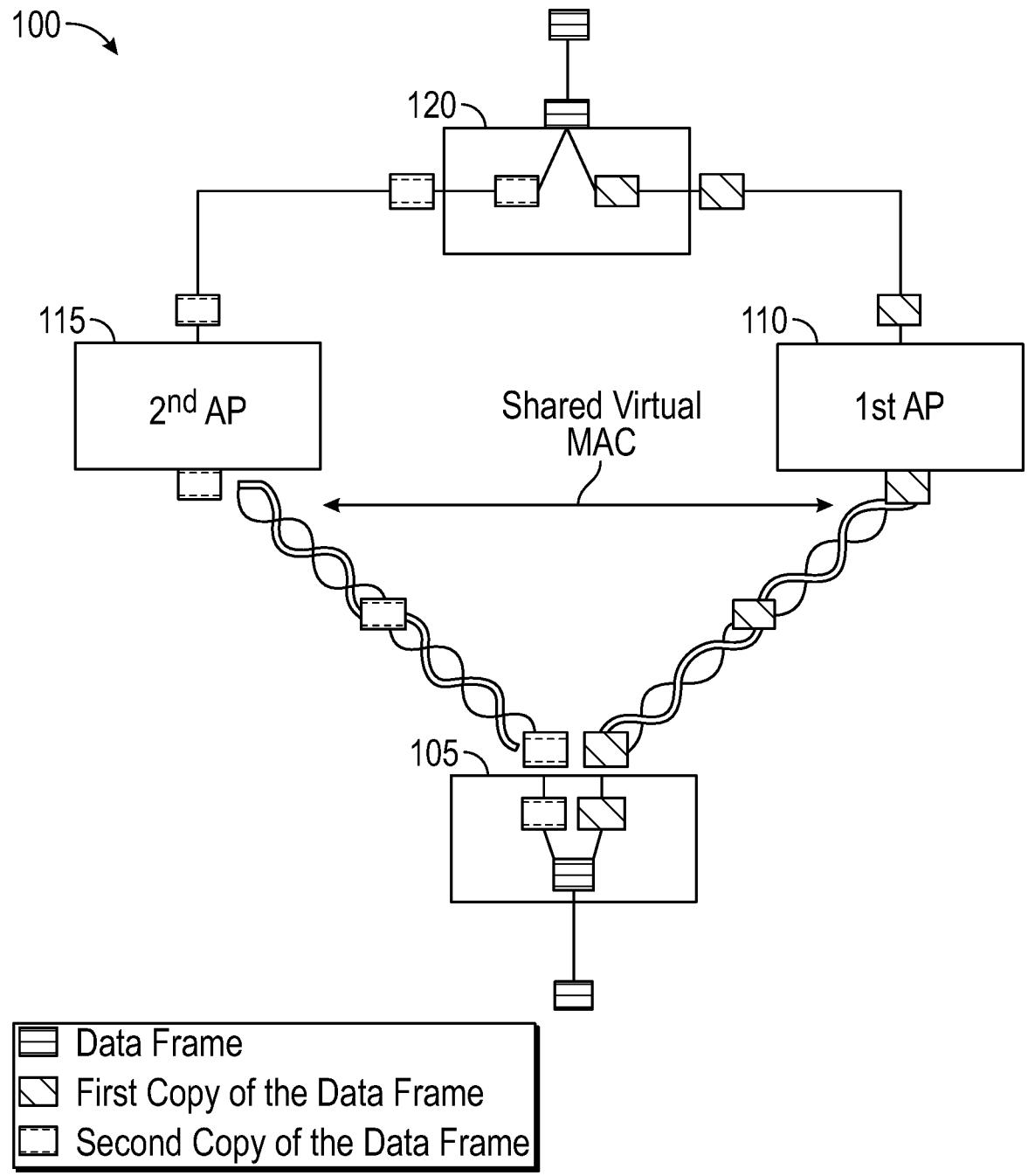
FIG. 1 is a block diagram of an operating environment.

Parallel Redundancy Protocol (PRP) using non-overlapping Resource Unit (RU) groupings may be provided. A first computing device may associate to a first Access Point (AP) at a virtual Media Access Control (MAC) address. Next, the first computing device may associate to a second AP at the virtual MAC address. Then data from a data frame may be replicated to a first one or more RUs in a channel. The first one or more RUs may be assigned to the first AP. Data from the data frame may then be replicated to a second one or more RUs in the channel. The second one or more RUs may be assigned to the second AP and may not overlap the first one or more RUs.

Both the foregoing overview and the following example embodiments are examples and explanatory only, and should not be considered to restrict the disclosure's scope, as described and claimed. Furthermore, features and/or variations may be provided in addition to those described. For example, embodiments of the disclosure may be directed to various feature combinations and sub-combinations described in the example embodiments.

Example Embodiments

The following detailed description refers to the accompanying drawings. Wherever possible, the same reference numbers are used in the drawings and the following description to refer to the same or similar elements. While embodiments of the disclosure may be described, modifications, adaptations, and other implementations are possible. For example, substitutions, additions, or modifications may be made to the elements illustrated in the drawings, and the methods described herein may be modified by substituting, reordering, or adding stages to the disclosed methods. Accordingly, the following detailed description does not limit the disclosure. Instead, the proper scope of the disclosure is defined by the appended claims.

Parallel Redundancy Protocol (PRP) is a network protocol standard for Ethernet that may provide seamless failover against failure of any network component. PRP may be used for applications that cannot withstand packet loss such as industrial internet, smart grids, factory automation, autonomous driving, remote surgery, intelligent transportation systems, power utilities, and manufacturing. Consistent with embodiments of the disclosure, to carry out PRP, redundancy boxes (i.e., redboxes) may be used. A redbox may comprise a switch or a Work Group Bridge (WGB) that may make two copies of each incoming data frame (i.e., replicate) and then send the replicated data frames on two independent paths in a network. One of the PRP replicated packets may be discarded by another redbox at the destination if both of the replicated packets make it to the destination. As will be described in greater detail below, a redbox may make an association with two upstream APs and transmit using two non-overlapping Resource Units (RU) groups respectively corresponding to the two upstream APs.

FIG. 1 shows an operating environment 100. As shown in FIG. 1, operating environment 100 may comprise a first computing device 105, a first AP 110, a second AP 115, and a second computing device 120. First computing device 105 and second computing device 120 may each comprise a redbox that may replicate and discard data frames as described above. First AP 110 and second AP 115 may provide wireless access for a client device connected to first computing device 105 and may operate using the IEEE 802.11 standard for example.

First computing device 105 may comprise a redbox operating in a WGB mode. A WGB may comprise a small stand-alone unit that may provide a wireless infrastructure connection for Ethernet-enabled devices for example. Devices that do not have a wireless client adapter in order to connect to a wireless network may be connected to the WGB through an Ethernet port. The WGB may associate to first AP 110 and second AP 115 through a wireless interface. Through the WGB, client devices may obtain access to the wireless network.

A client device that the WGB may provide wireless network access may, for example, correspond to an autonomous vehicle in motion or a robot moving about in a factory. The client device may comprise, but is not limited to, a smart phone, a personal computer, a tablet device, a mobile device, a cable modem, a remote control device, a set-top box, a digital video recorder, an Internet-of-Things (IoT) device, a network computer, a mainframe, a router, or other similar microcomputer-based device.

The elements described above of operating environment 100 (e.g., first computing device 105, first AP 110, second AP 115, and second computing device 120) may be practiced in hardware and/or in software (including firmware, resident software, micro-code, etc.) or in any other circuits or systems. The elements of operating environment 100 may be practiced in electrical circuits comprising discrete electronic elements, packaged or integrated electronic chips containing logic gates, a circuit utilizing a microprocessor, or on a single chip containing electronic elements or microprocessors. Furthermore, the elements of operating environment 100 may also be practiced using other technologies capable of performing logical operations such as, for example, AND, OR, and NOT, including but not limited to, mechanical, optical, fluidic, and quantum technologies. As described in greater detail below with respect to FIG. 4, the elements of operating environment 100 may be practiced in a computing device 400.

Figure 2A:
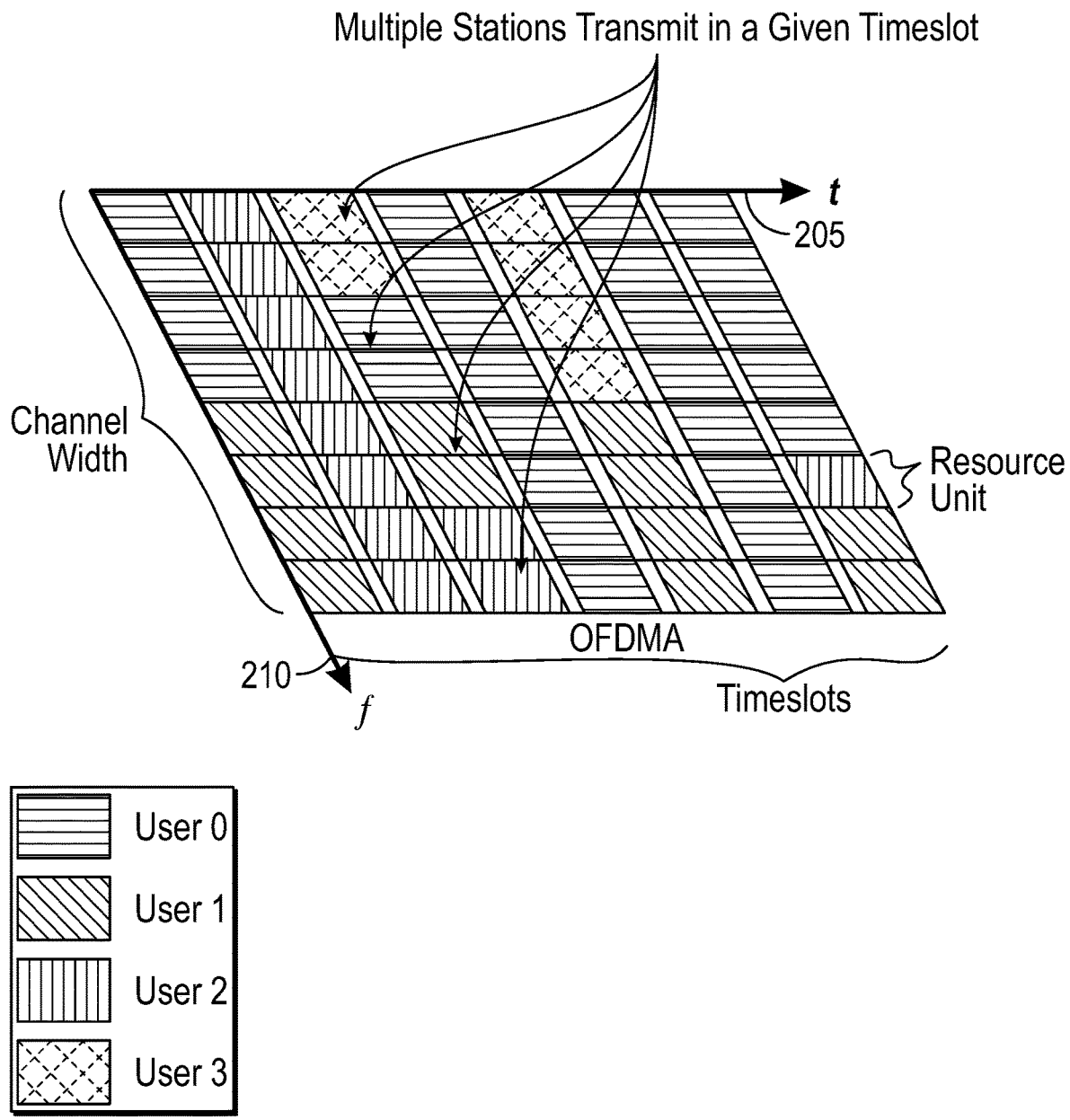
FIG. 2A is a diagram illustrating Orthogonal Frequency-Division Multiple Access (OFDMA)

FIG. 2A is a diagram illustrating Orthogonal Frequency-Division Multiple Access (OFDMA). First computing device 105, first AP 110, and second AP 115 may be compatible with the IEEE 802.11ax specification standard, for example, and may support OFDMA technology to provide media access to client devices. As shown in FIG. 2A, the media may be divided into time slots along a time axis 205 and may have a channel width along a frequency axis 210. When using OFDMA to provide media access, an AP may partition a channel into smaller sub-channels know as Resource Units (RUs) so that simultaneous multiple-user transmissions may occur. The channel width may comprise, for example, 20 MHz, broken into eight, 2 MHz RUs. Each RU may be separated from the next one with a few KHz of empty channel so with the eight, 2 MHz RUs and empty space, together the channel may be 20 MHz. An AP may determine RU allocation for multiple stations for both downlink and uplink OFDMA. In other words, the AP may determine how RUs may be assigned to stations (i.e., user 0, user 1, user 2, and user 3) within a given channel. The stations may provide feedback to IEEE 802.11ax compatible APs using, for example, solicited or unsolicited buffer status reports, however, the AP may make the decision in regards to RU allocation for synchronized Uplink (UL)-OFDMA from multiple client devices.

Figure 2B:
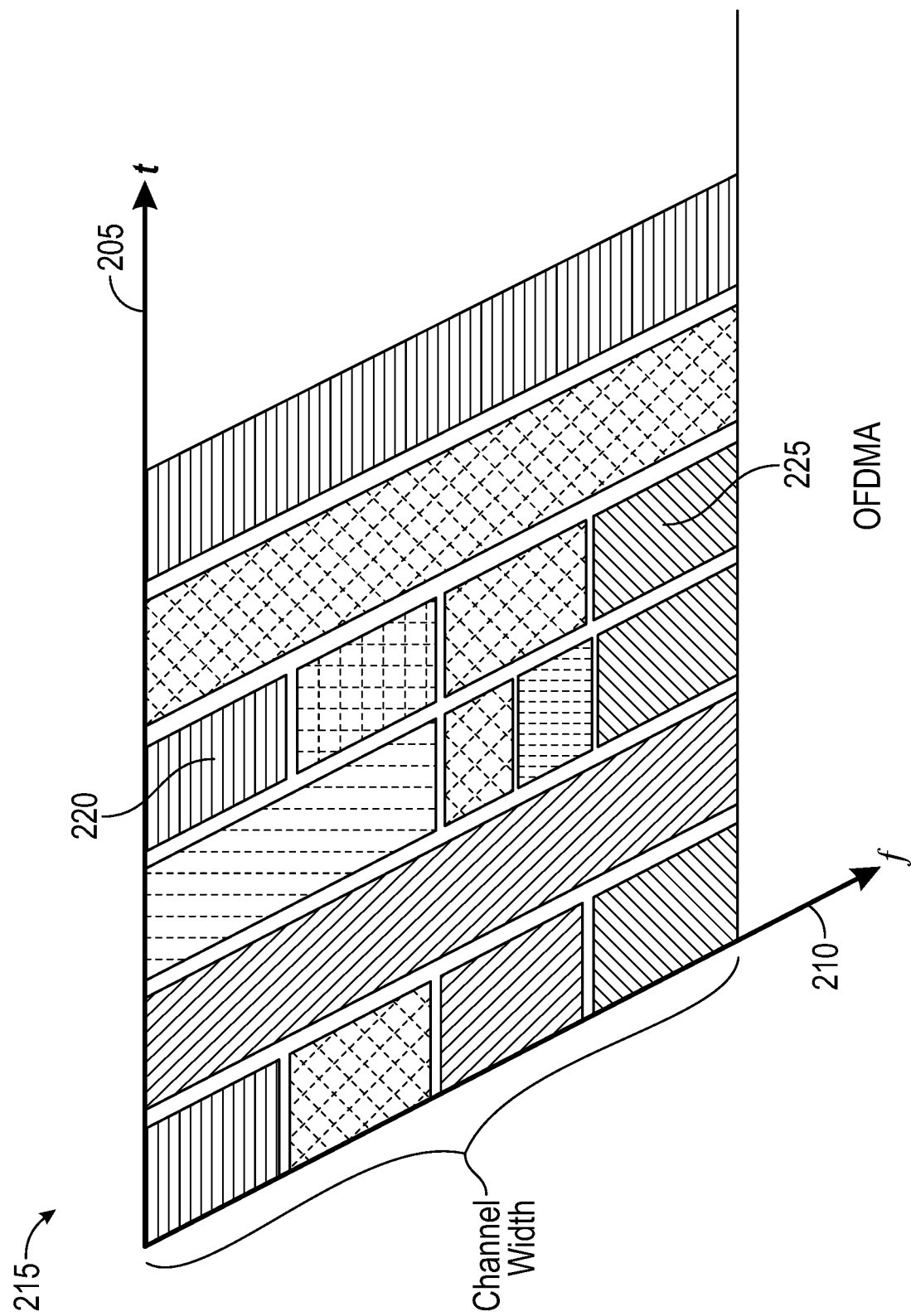
FIG. 2B is a diagram illustrating non-overlapping Resource Unit (RU) groupings.

FIG. 2B is a diagram illustrating non-overlapping RU groupings. As shown in FIG. 2B, a timeslot 215 may comprise a first RU grouping 220 and a second RU grouping 225. First RU grouping 220 may comprise, for example, two, 2 MHz RUs and second RU grouping 225 may comprise, for example, two, 2 MHz RUs. As will be described in greater detail below, first RU grouping 220 may comprise a first one or more RUs in a channel assigned to first AP 110 and second RU grouping 225 may comprise a second one or more RUs in the channel assigned to second AP 115.

Embodiments of the disclosure may provide multiple UL RU blocks from a device (e.g. first computing device 105) to multiple APs (e.g., first AP 110 and second AP 115) while leveraging IEEE 802.11ax compliant hardware. In doing so, embodiments of the disclosure may abide by the specification and related constraints of Off-the-shelf (OTS) commercial chipsets. As such, embodiments of the disclosure may use existing Trigger Frame (TF) and Multiuser Physical layer Protocol Data Unit (MU-PPDU) structures. Consequently user devices may be triggered by one AP that allocates the RUs (and associated MCS or data-rate) for its UL transmission. However, one constraint of IEEE 802.11ax may be that a single client device identified by an Association ID (AID) may only be assigned a single RU (unless that client device is part of, for example, a Multicast (MCAST) group). However, embodiments of the disclosure may assign multiple AIDs to a single virtual Media Access Control (MAC) address, for example, in software. In this case, for example, the TF may contain an RU assignment (and associated MCS or data-rate) for AID0, AID1, and AIDn corresponding to the association (AID) at each Basic Service Set Identifier (BSSID). In other words, a virtual MAC address of a device may contain two or more underlying AIDs exchanged between the cooperating APs.

On the TF itself, an efficient bandwidth process may be to designate a primary trigger AP and have all remaining APs operate in High Efficiency (HE) Trigger-Based (TB) Uplink (UL) MU-PPDU listen mode using a shared virtual Receiver MAC address (RA) described in more detail below. The selection of a primary AP may be based on a reasonable metric, for example, best uplink Received Signal Strength Indicator (RSSI)/Signal-to-Noise Ratio (SNR) of a frame received and may be chosen by a PRP redbox (e.g., first computing device 105) dynamically for each WGB. Each AP may still associated with the WGB on it's per BSSID AID and may send control information and even non-PRP data using distinct (un-related) RUs as well as legacy Single User (SU) (e.g., IEEE 802.11ac) operating modes. As the PRP client device moves, the primary AP may be changed and/or the AP Transmit (TX) power and related limits (e.g., OBSS_PD Min/Max, OFDMA Power offset) may be manipulated to maximize the probability of the PRP client device receiving the trigger and being heard my multiple APs.

Figure 3:
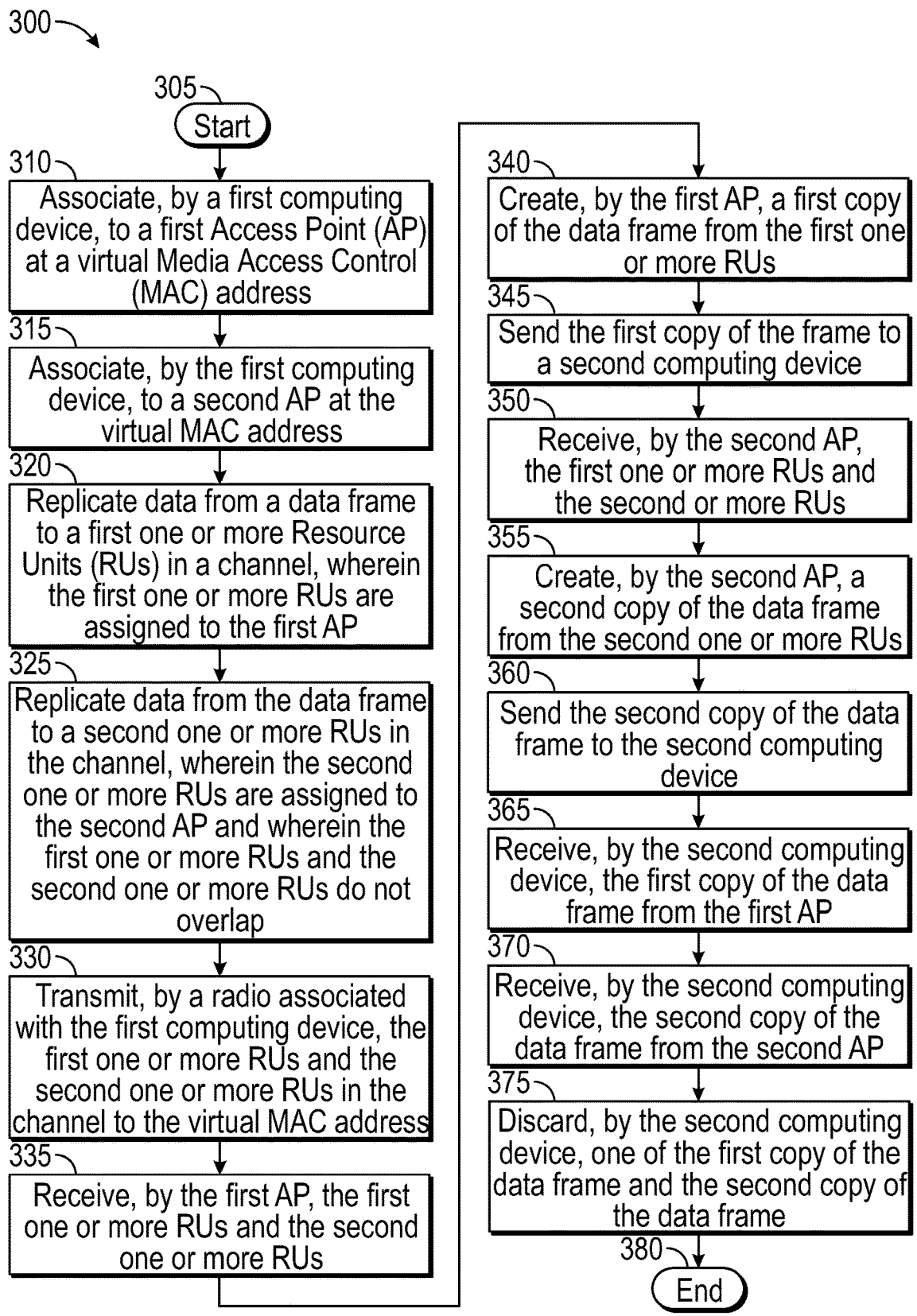
FIG. 3 is a flow chart of a method for providing Parallel Redundancy Protocol (PRP) using non-overlapping RU groupings.

FIG. 3 is a flow chart setting forth the general stages involved in a method 300 consistent with embodiments of the disclosure for providing PRP using non-overlapping RU groupings. Method 300 may be implemented using first computing device 105, first AP 110, second AP 115, and second computing device 120 as described in more detail above with respect to FIG. 1. Ways to implement the stages of method 300 will be described in greater detail below.

Method 300 may begin at starting block 305 and proceed to stage 310 where first computing device 105 may associate to first AP 110 at a virtual MAC address. For example, first computing device 105 may comprise a redbox functioning in a WGB mode in order to provide a client device wireless network access by associating with first AP 110. The client device may, for example, correspond to an autonomous vehicle in motion or a robot moving about in a factory.

From stage 310, where first computing device 105 associates to first AP 110 at the virtual MAC address, method 300 may advance to stage 315 where first computing device 105 may associate to second AP 115 at the virtual MAC address. For example, first computing device 105 may associate to second AP 115 while also maintaining its association to first AP 110 in order to implement PRP consistent with embodiments of the disclosure. In other words, first computing device 105 may make an association with two upstream APs (e.g., IEEE 802.11ax compliant APs) at the same time. The upstream association to the two APs may be accomplished using the same Service Set Identifier (SSID) on both sides. Associating a single computing device MAC address to two APs on the same SSID may not be permissible with conventional systems. For example, with IEEE 802.11, a single station (i.e., understood as a single MAC address) may not associate to more than one BSSID.

When mobile stations associate with an AP, the AP may assign an AID. The AID may be used for a variety of purposes. Consistent with embodiments of the disclosure, to accomplish dual AP association for PRP, first computing device 105 may use one virtual MAC address per association with a unique IEEE 802.11ax AID per BSSID. Potentially, first computing device 105 may associate to as many BSSIDs as there are AP radios in range. However, only two associations are needed for a minimum PRP implementation.

Furthermore, transmission of a frame to an AP may require a specific Receiver MAC address (RA), in addition to a Destination MAC address (DA). Consistent with embodiments of the disclosure, first computing device 105 and its associated APs (e.g., first AP 110 and second AP 115) may negotiate a virtual RA (i.e., virtual MAC address) shared among APs (in addition to each AP's native RA for the BSSID). This process may allow first computing device 105 to send redundant frames to a single RA on different RU blocks that are received and demodulated by at least two APs at the same time. This may allow PRP to function over a single Wi-Fi redbox radio consistent with embodiments of the disclosure.

Because first computing device 105 may roam to different APs, first computing device 105 may first request the shared MAC behavior of the upstream APs, which may facilitate the aforementioned dual association. First computing device 105 may accomplish this by associating to a primary AP (e.g., first AP 110). Based on its 11k report for example, first computing device 105 may request first AP 110 (i.e., acting as the primary AP) to negotiate virtual MAC address support with a next best or secondary AP (e.g., second AP 115) in an extension of the 11k report, association frames, or other exchange processes. The virtual MAC may therefore be carried with first computing device 105 from AP to AP as first computing device 105 roams. In other embodiments, the primary AP may coordinate a virtual MAC address with a secondary AP, for example, through over the air Neighbor Discovery Protocol (NDP) messages for each supported SSID where PRP is enabled. First computing device 105 may now have the dual association to both APs (i.e., first AP 110 and second AP 115).

Consistent with embodiments of the disclosure, inter-AP communication may be accomplished using, for example, the IEEE 802.11be standard. In other words, inter-AP communications between first AP 110 and second AP 115 including, for example, negotiate the virtual RA or negotiating for the assignment of the first one or more RUs to first AP 110 in the channel and for the assignment of the second one or more RUs to second AP 115 in the channel may be accomplished using, for example, the IEEE 802.11be standard.

Once first computing device 105 associates to second AP 115 at the virtual MAC address in stage 315, method 300 may continue to stage 320 where first computing device 105 may replicate data from a data frame to a first one or more RUs in a channel. The first one or more RUs may be assigned to first AP 110. For example, referring back to FIG. 2B, first RU grouping 220 may comprise the first one or more RUs in the channel assigned to first AP 110.

After first computing device 105 replicates data from the data frame to the first one or more RUs in the channel in stage 320, method 300 may proceed to stage 325 where first computing device 105 may replicate data from the data frame to a second one or more RUs in the channel. The second one or more RUs may be assigned to second AP 115 and the first one or more RUs and the second one or more RUs may not overlap. For example, referring back to FIG. 2B, second RU grouping 225 may comprise the second one or more RUs in the channel assigned to second AP 115.

Acting as the primary AP, first AP 110 may coordinate with second AP 115 for non-overlapping RU groups that may be used for uplink and downlink communication on first AP 110 and second AP 115. This may be accomplished using several different processes. In one embodiment, static PRP RU allocation may be used where PRP traffic may be identified along with corresponding RU characteristics (e.g., size and occurrence frequency), and the APs may agree on reserved PRP specific RU allocation over the air, or through a central allocation function (e.g., at a Wireless LAN Controller (WLC)). In another embodiment, a round robin PRP RU allocation may be used where APs (e.g., during the NDP exchange or through WLC allocation) may agree on a PRP slotting scheme for each AP and each RU. "Border" PRP RU allocation may be used in another embodiment where one AP may allocate the lower RUs of a given channel to PRP traffic while the other AP allocates the upper RUs in a non-overlapping fashion. Consistent with yet another embodiment, WGB-specific PRP RU allocation may be used where one AP may be elected as the primary AP and may make the RU allocation, while the other AP only accepts the RU allocation made by the primary AP. Channel state information (CSI)-based PRP RU allocation may comprise another embodiment where the result of explicit Multi-User, Multiple-Input, Multiple-Output (MU-MIMO) sounding or implicit measures may be used to select complimentary RUs. Complimentary RUs may comprise those that may be mathematically de-correlated (e.g., the 2 MHz RUs at the beginning and end of a 80 or 160 Mhz channel).

From stage 325, where first computing device 105 replicates data from the data frame to the second one or more RUs in the channel, method 300 may advance to stage 330 where a radio associated with first computing device 105 may transmit the first one or more RUs and the second one or more RUs in the channel to the virtual MAC address. For example, first AP 110 (e.g., as the primary AP) may issues a TF allocating RUs (and associated MCS or data-rate) to both AIDs of the same size and rate (or of different sizes and rate if channel metrics indicate each AP might have different receive RSSI). Then first computing device 105 may make copies of the data frame and send them on the different RUs (as per the TF assignment from the primary AP), in a single UL MU-PPDU frame. Consequently, embodiments of the disclosure may provide PRP using a single source radio (e.g., located with first computing device 105), rather than two radios.

Once the radio associated with first computing device 105 transmits the first one or more RUs and the second one or more RUs in the channel to the virtual MAC address in stage 330, method 300 may continue to stage 335 where first AP 110 may receive the first one or more RUs and the second one or more RUs. For example, the first one or more RUs and the second one or more RUs may be received by first AP 110 on a single UL MU-PPDU frame on the channel. The association between first computing device 105 and first AP 110 may comprise a first one of two independent paths in operating environment 100.

After first AP 110 receives the first one or more RUs and the second one or more RUs in stage 335, method 300 may proceed to stage 340 where first AP 110 may create a first copy of the data frame from the first one or more RUs. For example, while first AP 110 receives both the first one or more RUs and the second one or more RUs, first AP 110 may use the first one or more RUs to create the first copy of the data frame because the first one or more RUs were allocated to first AP 110.

From stage 340, where first AP 110 creates the first copy of the data frame from the first one or more RUs, method 300 may advance to stage 345 where first AP 110 may send the first copy of the data frame to second computing device 120. For example, after first AP 110 demodulates the UL MU-PPDU signal (potentially receiving the same PPDU on multiple RU's from each AID), the first copy of the data frame may be created from the demodulated signal and forwarded on a first of the two aforementioned independent paths in operating environment 100 towards second computing device 120.

Once first AP 110 sends the first copy of the data frame to second computing device 120 in stage 345, method 300 may continue to stage 350 where second AP 115 may receive the first one or more RUs and the second one or more RUs. For example, the first one or more RUs and the second one or more RUs may be received by second AP 115 on a single UL MU-PPDU frame on the channel. The association between first computing device 105 and second AP 115 may comprise a second one of two independent paths in operating environment 100.

After second AP 115 receives the first one or more RUs and the second one or more RUs in stage 350, method 300 may proceed to stage 355 where second AP 115 may create a second copy of the data frame from the second one or more RUs. For example, while second AP 115 receives both the first one or more RUs and the second one or more RUs, second AP 115 may use the second one or more RUs to create the second copy of the data frame because the second one or more RUs were allocated to second AP 115.

From stage 355, where second AP 115 creates the second copy of the data frame from the second one or more RUs, method 300 may advance to stage 360 where second AP 115 may send the second copy of the data frame to second computing device 120. For example, after second AP 115 demodulates the UL MU-PPDU signal (potentially receiving the same PPDU on multiple RU's from each AID), the second copy of the data frame may be created from the demodulated signal and forwarded on a second one of the two aforementioned independent paths in operating environment 100 towards the second computing device 120.

Once second AP 115 sends the second copy of the data frame to second computing device 120 in stage 360, method 300 may continue to stage 365 where second computing device 120 may receive the first copy of the data frame from first AP 110. For example, the first copy of the data frame may be received by second computing device 120 over the first one of the two aforementioned independent paths.

After second computing device 120 receives the first copy of the data frame from first AP 110 in stage 365, method 300 may proceed to stage 370 where second computing device 120 may receive the second copy of the data frame from second AP 115. For example, the second copy of the data frame may be received by second computing device 120 over the second one of the two aforementioned independent paths.

From stage 370, where second computing device 120 receives the second copy of the data frame from second AP 115, method 300 may advance to stage 375 where second computing device 120 may discard the first copy of the data frame or the second copy of the data frame. For example, when second computing device 120 receives redundant copies of the data frame, it may remove one of the redundant copies of the data frame by discarding either the first copy of the data frame or the second copy of the data frame. Accordingly, embodiments of the disclosure may provide PRP over a wireless network using dual non-overlapping RUs sent to different APs on the same SSID where the redundant frames are introduced onto their own independent paths. In some cases, however, second computing device 120 may fail to receive one of either the first copy of the data frame or the second copy of the data frame. In this situation, second computing device 120 may use whichever of the first copy of the data frame or the second copy of the data frame it received. Once second computing device 120 discards the first copy of the data frame or the second copy of the data frame in stage 375, method 300 may then end at stage 380.

Figure 4:
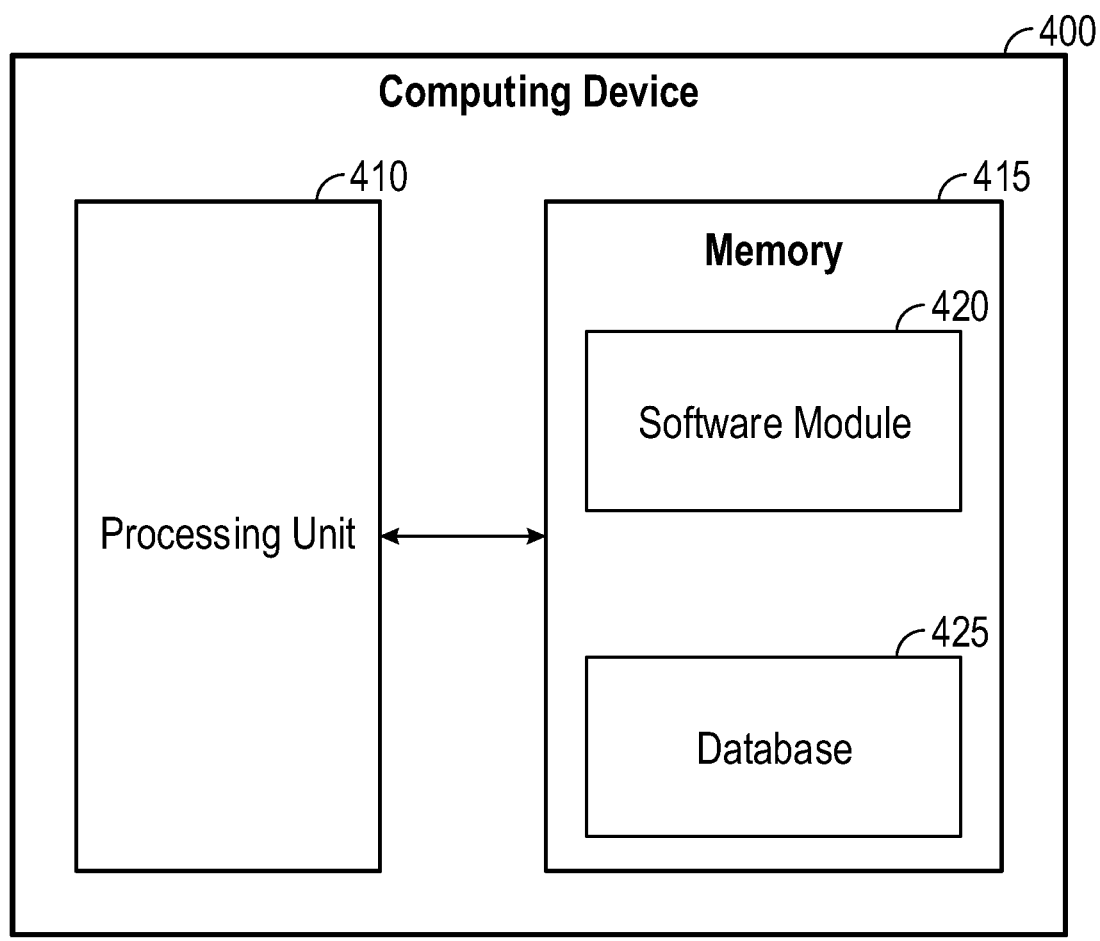
FIG. 4 is a block diagram of a computing device.

FIG. 4 shows computing device 400. As shown in FIG. 4, computing device 400 may include a processing unit 410 and a memory unit 415. Memory unit 415 may include a software module 420 and a database 425. While executing on processing unit 410, software module 420 may perform, for example, processes for providing PRP using non-overlapping RU groupings as described above with respect to FIG. 3. Computing device 400, for example, may provide an operating environment for first computing device 105, first AP 110, second AP 115, or second computing device 120. First computing device 105, first AP 110, second AP 115, or second computing device 120 may operate in other environments and are not limited to computing device 400.

Computing device 400 may be implemented using a Wireless Fidelity (Wi-Fi) access point, a cellular base station, a tablet device, a mobile device, a smart phone, a telephone, a remote control device, a set-top box, a digital video recorder, a cable modem, a personal computer, a network computer, a mainframe, a router, a switch, a server cluster, a smart TV-like device, a network storage device, a network relay devices, or other similar microcomputer-based device. Computing device 400 may comprise any computer operating environment, such as hand-held devices, multiprocessor systems, microprocessor-based or programmable sender electronic devices, minicomputers, mainframe computers, and the like. Computing device 400 may also be practiced in distributed computing environments where tasks are performed by remote processing devices. The aforementioned systems and devices are examples and computing device 400 may comprise other systems or devices.

Embodiments of the disclosure, for example, may be implemented as a computer process (method), a computing system, or as an article of manufacture, such as a computer program product or computer readable media. The computer program product may be a computer storage media readable by a computer system and encoding a computer program of instructions for executing a computer process. The computer program product may also be a propagated signal on a carrier readable by a computing system and encoding a computer program of instructions for executing a computer process. Accordingly, the present disclosure may be embodied in hardware and/or in software (including firmware, resident software, micro-code, etc.). In other words, embodiments of the present disclosure may take the form of a computer program product on a computer-usable or computer-readable storage medium having computer-usable or computer-readable program code embodied in the medium for use by or in connection with an instruction execution system. A computer-usable or computer-readable medium may be any medium that can contain, store, communicate, propagate, or transport the program for use by or in connection with the instruction execution system, apparatus, or device.

The computer-usable or computer-readable medium may be, for example but not limited to, an electronic, magnetic, optical, electromagnetic, infrared, or semiconductor system, apparatus, device, or propagation medium. More specific computer-readable medium examples (a non-exhaustive list), the computer-readable medium may include the following: an electrical connection having one or more wires, a portable computer diskette, a random access memory (RAM), a read-only memory (ROM), an erasable programmable read-only memory (EPROM or Flash memory), an optical fiber, and a portable compact disc read-only memory (CD-ROM). Note that the computer-usable or computer-readable medium could even be paper or another suitable medium upon which the program is printed, as the program can be electronically captured, via, for instance, optical scanning of the paper or other medium, then compiled, interpreted, or otherwise processed in a suitable manner, if necessary, and then stored in a computer memory.

While certain embodiments of the disclosure have been described, other embodiments may exist. Furthermore, although embodiments of the present disclosure have been described as being associated with data stored in memory and other storage mediums, data can also be stored on or read from other types of computer-readable media, such as secondary storage devices, like hard disks, floppy disks, or a CD-ROM, a carrier wave from the Internet, or other forms of RAM or ROM. Further, the disclosed methods' stages may be modified in any manner, including by reordering stages and/or inserting or deleting stages, without departing from the disclosure.

Furthermore, embodiments of the disclosure may be practiced in an electrical circuit comprising discrete electronic elements, packaged or integrated electronic chips containing logic gates, a circuit utilizing a microprocessor, or on a single chip containing electronic elements or microprocessors. Embodiments of the disclosure may also be practiced using other technologies capable of performing logical operations such as, for example, AND, OR, and NOT, including but not limited to, mechanical, optical, fluidic, and quantum technologies. In addition, embodiments of the disclosure may be practiced within a general purpose computer or in any other circuits or systems.

Embodiments of the disclosure may be practiced via a system-on-a-chip (SOC) where each or many of the elements illustrated in FIG. 1 may be integrated onto a single integrated circuit. Such an SOC device may include one or more processing units, graphics units, communications units, system virtualization units and various application functionality all of which may be integrated (or "burned") onto the chip substrate as a single integrated circuit. When operating via an SOC, the functionality described herein with respect to embodiments of the disclosure, may be performed via application-specific logic integrated with other components of computing device 400 on the single integrated circuit (chip).

Embodiments of the present disclosure, for example, are described above with reference to block diagrams and/or operational illustrations of methods, systems, and computer program products according to embodiments of the disclosure. The functions/acts noted in the blocks may occur out of the order as shown in any flowchart. For example, two blocks shown in succession may in fact be executed substantially concurrently or the blocks may sometimes be executed in the reverse order, depending upon the functionality/acts involved.

While the specification includes examples, the disclosure's scope is indicated by the following claims. Furthermore, while the specification has been described in language specific to structural features and/or methodological acts, the claims are not limited to the features or acts described above. Rather, the specific features and acts described above are disclosed as example for embodiments of the disclosure.

What is claimed is:

1. A method comprising:
    associating, by a first computing device, to a first Access Point (AP) at a virtual Media Access Control (MAC) address;
    associating, by the first computing device, to a second AP at the virtual MAC address;
    replicating data from a data frame to a first one or more Resource Units (RUs) in a channel, wherein the first one or more RUs are assigned to the first AP, and wherein the first AP creates a first copy of the data frame from the first one or more RUs;
    replicating data from the data frame to a second one or more RUs in the channel, wherein the second one or more RUs are assigned to the second AP, and wherein the second AP creates a second copy of the data frame from the second one or more RUs; and
    transmitting, by a radio associated with the first computing device, the first one or more RUs and the second one or more RUs in the channel to the virtual MAC address wherein the first AP receives both the first one or more RUs and the second one or more RUs and wherein the second AP receives both the first one or more RUs and the second one or more RUs.

2. The method of claim 1, further comprising negotiating, between the first AP and the second AP, for the assignment of the first one or more RUs to the first AP in the channel and for the assignment of the second one or more RUs to the second AP in the channel.

3. The method of claim 1, further comprising negotiating, between the first computing device, the first AP, and the second AP, for the assignment of the virtual MAC address.

4. The method of claim 1, further comprising:
    sending, by the first AP, the first copy of the data frame to an another computing device; and
    sending, by the second AP, the second copy of the data frame to the another computing device.

5. The method of claim 1, wherein the first AP creates the first copy of the data frame from the first one or more RUs.

6. An apparatus comprising:
    a memory storage; and
    a processing unit coupled to the memory storage, wherein the processing unit is operative to:
        associate to a first Access Point (AP) at a virtual Media Access Control (MAC) address;
        associate to a second AP at the virtual MAC address;
        replicate data from a data frame to a first one or more Resource Units (RUs) in a channel, wherein the first one or more RUs are assigned to the first AP, and wherein the first AP creates a first copy of the data frame from the first one or more RUs;
        replicate data from the data frame to a second one or more RUs in the channel, wherein the second one or more RUs are assigned to the second AP, and wherein the second AP creates a second copy of the data frame from; and transmit, by a radio, the first one or more RUs and the second one or more RUs in the channel to the virtual MAC address wherein the first AP receives both the first one or more RUs and the second one or more RUs and wherein the second AP receives both the first one or more RUs and the second one or more RUs.

7. The apparatus of claim 6, wherein the first AP and the second AP are operative to negotiate between each other for the assignment of the first one or more RUs to the first AP in the channel and for the assignment of the second one or more RUs to the second AP in the channel.

8. The apparatus of claim 6, wherein the apparatus, the first AP, and the second AP are operative to negotiate between each other for the assignment of the virtual MAC address.

9. The apparatus of claim 6, wherein the first AP sends the first copy of the data frame to an another computing device, and wherein the second AP sends the second copy of the data frame to the another computing device.

10. The apparatus of claim 6, wherein the first AP creates the first copy of the data frame from the first one or more RUs.

11. A non-transitory computer-readable medium that stores a set of instructions which when executed performs a method comprising:
  associating, by a computing device, to a first Access Point (AP) at a virtual Media Access Control (MAC) address;
  associating, by the computing device, to a second AP at the virtual MAC address;
  replicating data from a data frame to a first one or more Resource Units (RUs) in a channel, wherein the first one or more RUs are assigned to the first AP, and wherein the first AP creates a first copy of the data frame from the first one or more RUs;
  replicating data from the data frame to a second one or more RUs in the channel, wherein the second one or more RUs are assigned to the second AP, and wherein the second AP creates a second copy of the data frame from; and
  transmitting, by a radio associated with the first computing device, the first one or more RUs and the second one or more RUs in the channel to the virtual MAC address wherein the first AP receives both the first one or more RUs and the second one or more RUs and wherein the second AP receives both the first one or more RUs and the second one or more RUs.

12. The non-transitory computer-readable medium of claim 11, further comprising negotiating, between the first AP and the second AP, for the assignment of the first one or more RUs to the first AP in the channel and for the assignment of the second one or more RUs to the second AP in the channel.

13. The non-transitory computer-readable medium of claim 11, further comprising negotiating, between the first computing device, the first AP, and the second AP, for the assignment of the virtual MAC address.

14. The non-transitory computer-readable medium of claim 11, wherein the first AP sends the first copy of the data frame to an another computing device, and wherein the second AP sends the second copy of the data frame to the another computing device.

\* \* \* \* \*